United States Patent
Cadeddu

(10) Patent No.: US 10,532,723 B2
(45) Date of Patent: Jan. 14, 2020

(54) HYDRAULIC DEVICE FOR CONTROLLING BRAKING FOR FARM VEHICLES AND THE LIKE

(71) Applicant: VHIT S.P.A., Offanengo (IT)

(72) Inventor: Leonardo Cadeddu, Offanengo (IT)

(73) Assignee: VHIT S.P.A., Offanengo (CR) (IT)

( * ) Notice: Subject to any disclaimer, the term of this patent is extended or adjusted under 35 U.S.C. 154(b) by 43 days.

(21) Appl. No.: 16/064,071

(22) PCT Filed: Dec. 7, 2016

(86) PCT No.: PCT/IB2016/057408
§ 371 (c)(1),
(2) Date: Jun. 20, 2018

(87) PCT Pub. No.: WO2017/115186
PCT Pub. Date: Jul. 6, 2017

(65) Prior Publication Data
US 2019/0001945 A1    Jan. 3, 2019

(30) Foreign Application Priority Data
Dec. 29, 2015    (IT) .......................... 102015000088222

(51) Int. Cl.
*B60T 13/14*    (2006.01)
*B60T 11/236*    (2006.01)

(52) U.S. Cl.
CPC ........... *B60T 13/145* (2013.01); *B60T 11/236* (2013.01)

(58) Field of Classification Search
CPC ..... B60T 13/145; B60T 11/236; B60T 8/4004
See application file for complete search history.

(56) References Cited

U.S. PATENT DOCUMENTS

| 8,177,306 B2 | 5/2012 | Cadeddu et al. |
| 8,292,051 B2 | 10/2012 | Cadeddu et al. |
| 8,522,935 B2 | 9/2013 | Cadeddu |
| 8,789,668 B2 | 7/2014 | Alberti et al. |
| 8,820,855 B2* | 9/2014 | Cadaddu ............... B60T 8/4004 188/345 |
| 9,126,574 B2 | 9/2015 | Cadeddu |

(Continued)

FOREIGN PATENT DOCUMENTS

EP    2749462 A1    7/2014

*Primary Examiner* — Thomas E Lazo
(74) *Attorney, Agent, or Firm* — Howson & Howson LLP

(57) ABSTRACT

A hydraulic device for controlling braking for farm tractors, earthmovers and like machines, comprises a master cylinder and brake booster. A piston of the brake booster defines first and second chambers which, under rest conditions, are in communication and, during braking, are cut off with the first chamber being put in communication with a discharge chamber of the master cylinder. The piston of the master cylinder is driven by a drive piston shaped to define with a plunger of the piston of the brake booster a hollow space through which the first chamber communicates with either the second chamber or the discharge chamber, depending on device operating conditions. In the plunger, a seat for a gasket-valve is arranged to cooperate with the drive piston, during braking, to prevent fluid leakage between the second and the first chamber as a consequence of the sliding of the drive piston caused by braking.

4 Claims, 1 Drawing Sheet

(56) References Cited

U.S. PATENT DOCUMENTS 9,421,954 B2     8/2016   Cadeddu
2004/0212248 A1* 10/2004   Cadeddu ............... B60T 13/145
                                                                 303/114.1

* cited by examiner

HYDRAULIC DEVICE FOR CONTROLLING BRAKING FOR FARM VEHICLES AND THE LIKE

TECHNICAL FIELD

The present invention refers to servo-controlled hydraulic braking systems for operating machines, such as farm tractors, earthmovers and the like, and more particularly it concerns an assembly consisting of a master cylinder and a servo-control device (brake booster) for one such system.

PRIOR ART

In the vehicles considered, like those mentioned above, braking is generally controlled by a master cylinder, or a master cylinder pair acting, or each acting, as a pump, which cylinder(s) is (are) operated by a pedal or a respective pedal.

Many such systems include braking assistance hydraulic devices (brake boosters) associated with the or each master cylinder and advantageously formed in the same body as the cylinder.

Examples of braking systems of such kind are disclosed for instance in patent applications EP 1457400, WO 2009/090078 and WO 2012/035498 in the name of the Applicant and are known in the field as "Hydroboosters".

Recently, new regulations have been introduced requiring, inter alia, that in vehicles of the kind considered equipped with a brake booster it is possible to perform a high number of braking operations with servo-control after the vehicle engine has been turned off and only the reserve of pressurised fluid of the accumulator is available. This entails an optimum management of the pressurised fluid, by avoiding losses and/or waste.

SUMMARY OF THE INVENTION

It is an object of the present invention to provide an improved device for controlling braking for achieving the above aims.

The invention is applied to a device for controlling braking comprising at least one master cylinder and at least one brake booster formed in a common body, wherein: a piston of the master cylinder defines a pressurised chamber of the master cylinder, connected to vehicle brakes; a piston of the brake booster defines a first and a second pressurised chamber of the brake booster, associated with communication means arranged, under rest conditions, to establish a communication between the first and the second pressurised chamber of the brake booster and, during braking, to cut off such a communication and to establish a communication between the first chamber of the brake booster and the chamber of the master cylinder; the piston of the master cylinder is driven by a drive piston, which is mounted so as to be tightly slidable within a plunger of the piston of the brake booster and is operated as a consequence of the actuation of a brake pedal; and the drive piston is so shaped as to define, together with the plunger of the piston of the brake booster, a hollow space through which the first chamber of the brake booster is put in communication with either the second chamber of the brake booster or the chamber of the master cylinder, depending on the operating conditions of the device. In the plunger of the piston of the brake booster, between a passageway putting the second chamber of the brake booster in communication with the hollow space and a passageway putting the hollow space in communication with the first chamber of the brake booster, there is provided a seat for a gasket-valve arranged to cooperate with the drive piston, during braking, in order to prevent fluid leakage between the second and the first chamber of the brake booster through the hollow space when the passageway putting the second chamber of the brake booster in communication with the hollow space is closed as a consequence of the sliding of the drive piston caused by braking.

Preferred features of the invention are set forth in the dependent claims.

BRIEF DESCRIPTION OF THE FIGURES

Other advantages and features of the invention will become more apparent from the following detailed description of a preferred embodiment, with reference to the accompanying drawings, in which.

DESCRIPTION OF A PREFERRED EMBODIMENT

Figure 1:
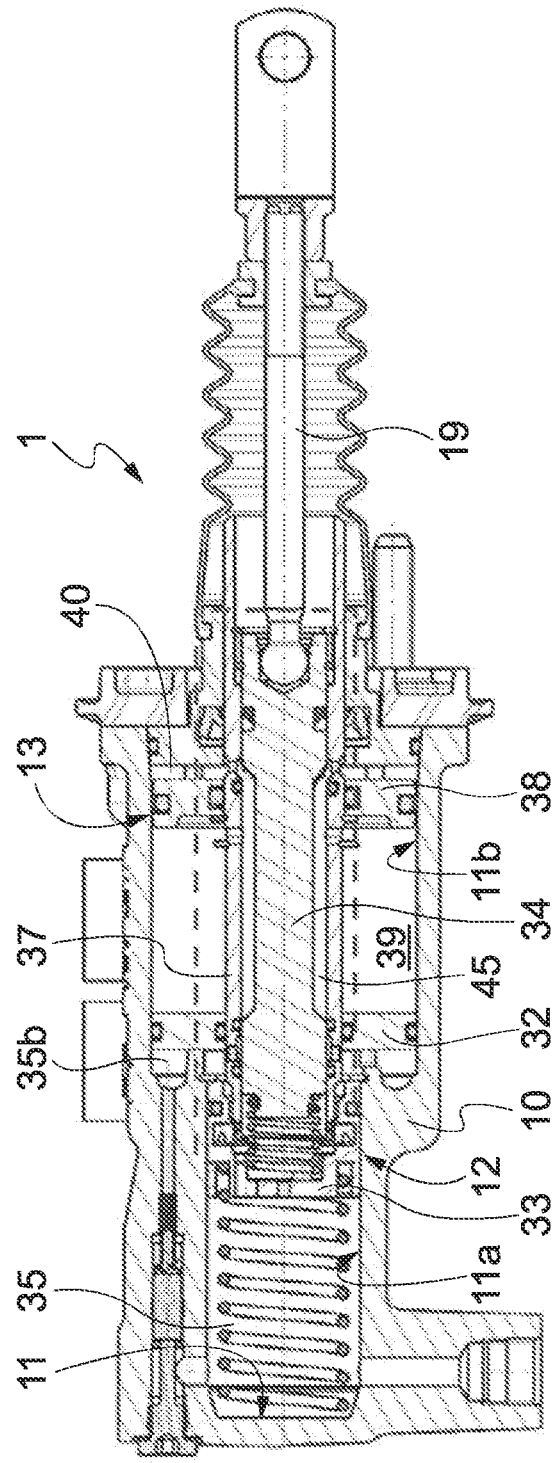
FIG. 1 is a longitudinal vertical section of a master cylinder-brake booster assembly according to the invention, shown in rest conditions.
Figure 2:
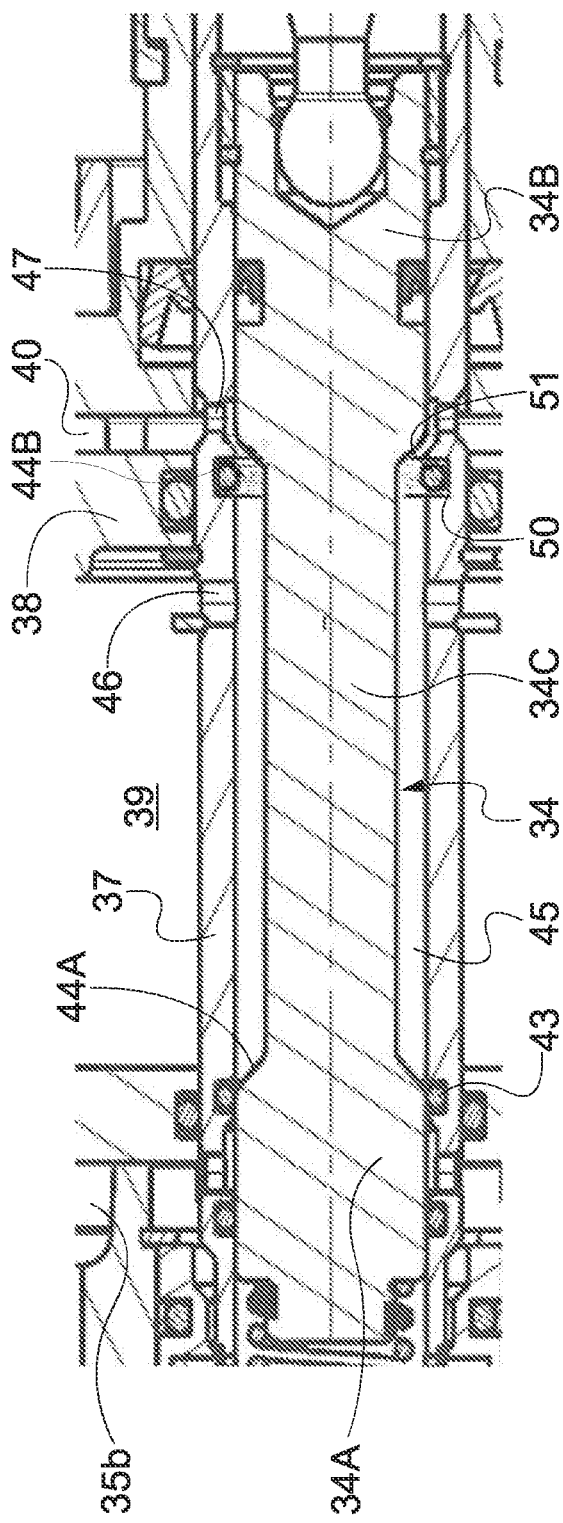
FIG. 2 is an enlarged view of a detail of the assembly of FIG. 1, enclosed within broken lines.

Referring to FIG. 1, there is shown a hydraulic braking device 1 (also referred to herein as master cylinder-brake booster assembly) according to the invention, which belongs to the braking system of a farm vehicle or the like. The general structure of device 1 corresponds to the structure disclosed in EP 1457400, to which reference is made for a detailed description of the structure itself and its operation. Here the main components of device 1 will be shortly illustrated, by paying attention to the components necessary for the understanding of the present invention.

In the description, "rear" refers to the part of device 1 located on the side of the brake pedal, and "front" to the opposite part (brake side).

Device 1 includes a body 10 with an axial bore 11 housing the members of both master cylinder 12 and brake booster 13. The axial bore is divided by a stationary disc 32 into a front part 11A with reduced diameter, where piston 33 of master cylinder 12 is longitudinally slidable, and a rear part 11B of larger diameter, where piston 38 of brake booster 13 is longitudinally slidable.

Piston 33 defines, in front part 11A, a chamber 35, which is arranged to contain oil at a control pressure depending on the force applied to the same piston by means of the or a brake pedal (not shown), and which communicates with one or more brakes of the vehicle. Piston 33 is associated with a drive piston 34, which extends through rear part 11B of bore 11 and is connected to an actuating rod 19, in turn connected to the pedal.

Said drive piston 34 preferably has end portions 34A, 34B of larger diameter and a central portion 34C of reduced diameter that, together with regions or steps 44A, 44B for connection with portions 34A, 34B of larger diameter, defines a hollow space 45 between the outer surface of drive piston 34 and the inner surface of a plunger 37 of piston 38 of the brake-booster.

Plunger 37 is slidably mounted on drive piston 34 and engages in fluid tight manner end portions 34A, 34B of the latter.

Piston 38 of the brake-booster further defines, in rear part 11B of bore 11, a pressurised front chamber (or first chamber) 39 and a pressurised rear chamber (or second chamber) 40, the latter communicating with a pressurised oil reservoir (not shown).

Passageways 46 and 47 passing through plunger 37 are provided between chambers 39 and 40, respectively, and hollow space 45 and, under rest conditions of the device, they put front chamber 39 in communication with chamber 40 through hollow space 45.

Further passageways are provided between hollow space 45 and chamber 35 of the master cylinder and are formed between the outer surface of drive piston 34 and the inner surface of plunger 37. Said passageways are controlled by a suitable system of gaskets and valves and are arranged to establish communication between front chamber 39 and chamber 35b of the master cylinder during braking, and to cut off such a communication in rest conditions of the device. Such a valve system includes, inter alia, a gasket-valve 43 associated with plunger 37 and arranged to cooperate with front part 34A of drive piston 34.

According to the invention, in order to improve separation between chambers 39 and 40 during braking, a seat 50 for a second gasket-valve 51 is formed on inner surface of plunger 37, in a region intermediate passageways 46 and 47. Gasket-valve 51 is located immediately ahead of passageways 47 and, during braking, it cooperates with the outer surface of drive piston 34, in particular with region 44 connecting portions 34C and 34B thereof, in order to prevent any fluid leakage. Such a leakage would instead occur when the separation between chambers 39 and 40 during braking only relies on the direct cooperation (covering) between the outer surface of drive piston 34 and the inner surface of plunger 37 of brake-booster piston 38, like in the device known from EP 1457400.

The operation of the described device is substantially identical to that of the device known from EP 1457400, and therefore it is not necessary to provide details thereof. Only the aspects related to the provision of gasket-valve 51 will be disclosed.

Upon braking, the forward movement of drive piston 34 caused by rod 19, in turn actuated by the pedal, causes gradual closure of passageway 47 and makes connecting step 44B cooperate with gasket-valve 51 in order to block any fluid leakage from passageway 47 to passageway 46 (and hence from chamber 40 to chamber 39) through hollow space 45. When passageway 47 is completely closed, a complete and fluid-tight separation thus occurs between chambers 39 and 40. At the same time, through the valve system including gasket-valve 43, communication between chamber 39 and a discharge chamber 35b progressively opens, thereby modulating the pressure in front chamber 39. When the brake is released, after communication between discharge chamber 35b and chamber 39 has been cut off, and in particular after gasket-valve 43 has been closed, a passage of fluid from chamber 40 to chamber 39, modulated by the progressive opening of gasket-valve 51, will occur, consequently re-balancing in modulated manner the pressures in chambers 39 and 40, until the rest position is reached and passageway 47 is again completely open, which will restore pressure equality in chambers 39 and 40.

It is clear that the elimination of fluid leakage obtained by means of gasket-valve 51 allows eliminating fluid losses and/or waste, so that the requirement that the braking system can perform a high number of servo-controlled brakings after the vehicle engine has been turned off and only the reserve of pressurised fluid of the accumulator is available is better met.

Loss and/or waste elimination moreover optimises pressurised fluid exploitation also during normal use of the brakes while the motor is turned on, and this in turn entails a reduction in the energy used and hence in $CO_2$ emissions.

It is also clear that optimising fluid exploitation contributes to the attainment of a compact size of the fluid accumulator, and hence of the whole braking system 1.

Advantageously, the device according to the invention, as disclosed, can also be applied to braking systems including pre-filling devices, like those disclosed for instance in patent document EP 1457400_A1.

It is clear that the above description has been given only by way of non-limiting example and that changes and modifications are possible without departing from the scope of the invention. Thus, for instance, even if reference has been made to simple single-stage master cylinders, the invention could also be applied to two-stage cylinders, i.e. cylinders in which the piston comprises two telescopically connected portions with different diameters, or to tandem cylinders, i.e. cylinders with a primary and a secondary piston defining fluidically separated primary and secondary chambers. Furthermore, it is clear that the invention can be applied also to tracked vehicles, in which the braking systems are associated with the track drive wheels.

The invention claimed is:

1. A hydraulic device (1) for controlling braking, in particular for operating machines such as farm tractors, earthmovers and the like, the device comprising at least one master cylinder (12) and at least one brake booster (13) formed in a common body (10), wherein:
   a piston (33) of the master cylinder (12) defines a pressurised chamber (35) of the master cylinder, connected to vehicle brakes;
   a piston (38) of the brake booster (13) defines a first and a second pressurised chamber (39, 40) of the brake booster, associated with communication means arranged, under rest conditions, to establish a communication between the first and the second pressurised chamber (39, 40) of the brake booster and, during braking, to cut off such a communication and to establish a communication between the first chamber (39) of the brake booster and a discharge chamber (35b) of the master cylinder (12);
   the piston (33) of the master cylinder (12) is driven by a drive piston (34), which is mounted so as to tightly slide within a plunger (37) of the piston (38) of the brake booster (13) and is operated as a consequence of the operation of a brake pedal; and
   the drive piston (34) is so shaped as to define, together with the plunger (37) of the piston (38) of the brake booster (13), a hollow space (45) through which the first chamber (39) of the brake booster is put in communication with either the second chamber (40) of the brake booster or the discharge chamber (35b) of the master cylinder (12), depending on the operating conditions of the device;
   the device (1) being characterised in that in said plunger (37) of the piston (38) of the brake booster (13), between a passageway (47) putting the second chamber (40) of the brake booster in communication with the hollow space (45) and a passageway (46) putting the hollow space (45) in communication with the first chamber (39) of the brake booster, there is provided a seat (50) for a gasket-valve (51) arranged to cooperate with the drive piston (34), during braking, in order to prevent fluid leakage between the second and the first chamber (40, 39) of the brake booster through the hollow space (45) when the passageway (47) putting the second chamber (40) of the brake booster in communication with the hollow space (45) is closed as a consequence of the sliding of the drive piston (34) caused by braking.

2. The device as claimed in claim 1, wherein said gasket-valve (51) is arranged to cooperate with a region (44B) of said drive piston (34) connecting a central portion (34C) defining the hollow space (45) with an end portion (34A) tightly sliding in the plunger (37) of the piston (38) of the brake booster (13) and closing, during braking, said passageway (47) putting the second chamber (40) in communication with the hollow space (45).

3. The device as claimed in claim 2, wherein said gasket-valve (51) is further arranged to modulate a pressure re-balancing between the first and the second chamber (40, 39) while the drive piston (34) is sliding back to rest conditions at the end of a braking.

4. The device as claimed in claim 1, wherein said gasket-valve (51) is further arranged to modulate a pressure re-balancing between the first and the second chamber (40, 39) while the drive piston (34) is sliding back to rest conditions at the end of a braking.

* * * * *